United States Patent

[11] 3,575,445

[72] Inventor David Walter French
Somerville, N.J.
[21] Appl. No. 821,880
[22] Filed May 5, 1969
Division of Ser. No. 466,554, June 24, 1965, Pat. No. 3,491,171.
[45] Patented Apr. 20, 1971
[73] Assignee Johns-Manville Corporation
New York, N.Y.

[54] THERMALLY INSULATED PIPE
5 Claims, 2 Drawing Figs.
[52] U.S. Cl. .................................................. 285/47,
285/55, 285/369, 285/463
[51] Int. Cl. .............................................. F16l 55/00
[50] Field of Search ........................................ 138/114,
149, 178; 285/47, 55, 138, 230, 369, 423; 264/45

[56] References Cited
UNITED STATES PATENTS
| | | | |
|---|---|---|---|
| 2,209,547 | 7/1940 | Whitacre...................... | 138/149X |
| 2,419,278 | 4/1947 | Motsenbucker.............. | 138/149X |
| 3,307,860 | 3/1967 | Blount et al. ................. | 285/55 |
| 3,317,074 | 5/1967 | Barker et al. ................. | 138/149X |

FOREIGN PATENTS
| | | | |
|---|---|---|---|
| 70,800 | 4/1942 | Czechoslovakia............ | 285/55 |
| 962,180 | 7/1964 | Great Britain................ | 138/149 |

Primary Examiner—Dave W. Arola
Attorneys—John A. McKinney and Robert M. Krone

ABSTRACT: A thermally insulated pipe comprising an outer and inner asbestos-cement pipe held in supported and spaced relationship by thermally insulated material.

Patented April 20, 1971
3,575,445
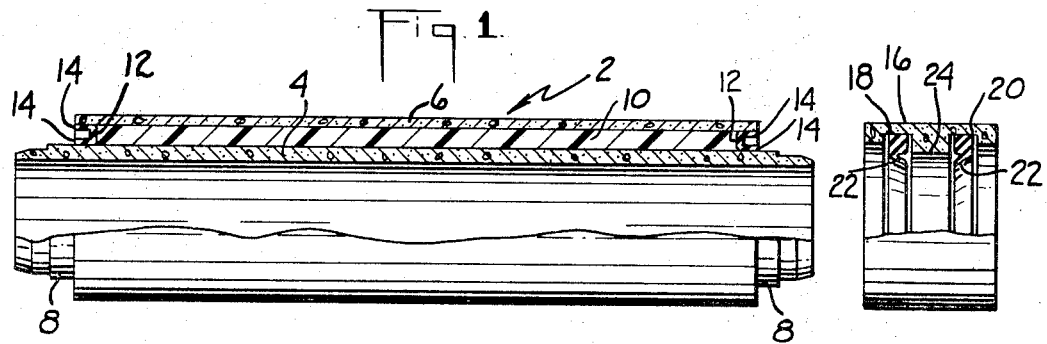
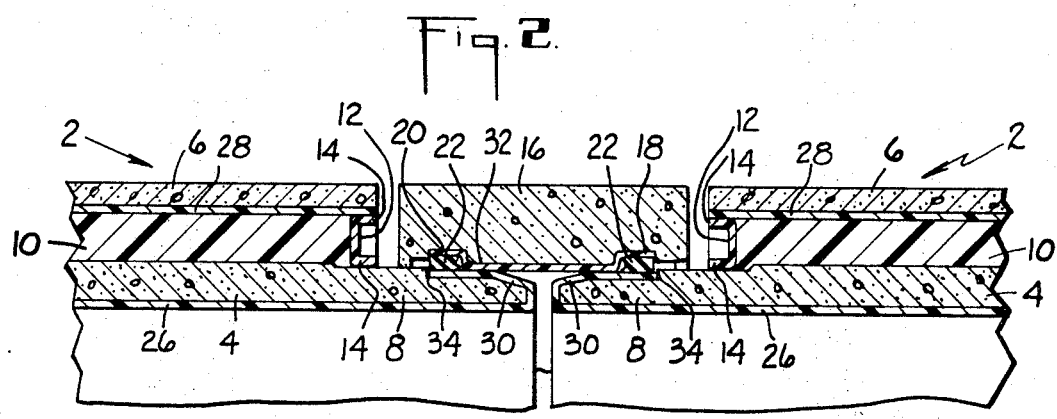
INVENTOR.
DAVID WALTER FRENCH
BY
John A. McKinney
ATTORNEY

THERMALLY INSULATED PIPE

BACKGROUND OF THE INVENTION

This application is a division of my copending application Ser. No. 466,554 filed Jun. 24, 1965 and now U.S. Pat. No. 3,491,171.

This invention relates to thermally insulated pipe and methods for forming the same. More specifically, the invention is directed to thermally insulated pipe for underground installation and which pipe preferably comprises the combination of a pair of coaxial asbestos-cement pipes having thermal-insulating material therebetween. The invention is further directed to a complete thermally insulated piping system having a readily assembled and good joint system using thermally insulated pipes and couplings which are prefabricated at the factory.

Thermally insulated piping systems currently in use for underground installation are generally of the type comprising a conventional, heavy duty, inner metallic pipe that is covered with thermal-insulating material and encased within an outer carrier pipe such as an asbestos-cement pipe. In this type of thermally insulated pipe, a plurality of spacers are used at periodic intervals to hold the inner and outer pipes in spaced relationship and to prevent injury to the thermal insulation. Also, these spacers are provided so that any moisture which accumulates in the system will not contact the thermal-insulating material. Provision is made in such systems for the draining of this moisture at periodic intervals. Therefore, thermally insulated pipe of this nature requires a plurality of relatively short sections of thermal-insulating material which must be positioned properly relative to the spacers in addition to being properly positioned relative to the inner and outer pipes. Another problem connected with these spacers is that they form a direct heat path between the inner and outer pipes.

BRIEF SUMMARY OF THE INVENTION

It is an object of the instant invention to provide a factory assembled thermally insulated asbestos-cement pipe that may be readily installed in the field and methods for making such pipe.

The foregoing object is accomplished in accordance with the instant invention by a thermally insulated pipe comprising a first and a second asbestos-cement pipe of different diameters arranged in coaxial relationship so as to provide an annular space between the outer surface of the first asbestos-cement pipe and the inner surface of the second asbestos-cement pipe. The annular space between the first and second asbestos-cement pipes is filled with a thermal-insulating material which in the preferred embodiment of the invention comprises a foamed polyurethane which has been foamed in place and which when cured supports the pipes in their coaxial relationship. The first asbestos-cement pipe extends in an axial direction a distance greater than the axial extent of the second asbestos-cement pipe so as to provide each thermally insulated pipe with end portions which may be inserted into a conventional asbestos-cement coupling provided with resilient sealing gaskets to form an effective joint. Thus, the instant invention provides a factory assembled thermally insulated pipe and coupling that may be field installed to provide an efficient conduit for chilled or heated fluids.

BRIEF DESCRIPTION OF THE DRAWINGS

The invention will be more fully understood and further objects and advantages thereof will become apparent when reference is made to the following detailed description of a preferred embodiment of the invention and the accompanying drawings in which:

FIG. 1 is a view partially in cross section of a thermally insulated asbestos-cement pipe and an asbestos-cement coupling for use therewith; and FIG. 2 is a view in cross section of a portion of an asbestos-cement pipe system made in accordance with the instant invention.

DESCRIPTION OF THE PREFERRED EMBODIMENT

Referring to the drawings and, in particular, to FIG. 1, there is illustrated a thermally insulated pipe 2 comprising a first asbestos-cement pipe 4 and a second asbestos-cement pipe 6. The outer diameter of the first asbestos-cement pipe 4 is less than the inner diameter of the second asbestos-cement pipe 6 so that when the first and second asbestos-cement pipes are mounted in coaxial relationship, as illustrated in FIG. 1, an annular space exists between the outer surface of the first asbestos-cement pipe and the inner surface of the second asbestos-cement pipe. The first asbestos-cement pipe 4 has an axial extent greater than the axial extent of the second asbestos-cement pipe 6 so that when the two pipes are in assembled relation, as illustrated in FIG. 1, with the second asbestos-cement pipe located axially in a central position relative to the first asbestos-cement pipe, there exists an end portion 8 adjacent each axial extremity of the thermally insulated pipe 2. Each of such end portions 8 is a portion of the first asbestos-cement pipe 4.

The annular space between the outer surface of the first asbestos-cement pipe and the inner surface of the second asbestos-cement pipe is filled with a thermal-insulating material 10, which, in the preferred embodiment of the invention, comprises a foamed polyurethane. Adjacent each axial extremity of the second asbestos-cement pipe there is provided a ring-shaped end plug 12 in contact with the thermal-insulating material 10. Each end plug 12 bridges the annular space between the outer surface of the first asbestos-cement pipe and the inner surface of the second asbestos-cement pipe and is provided with annular flanges 14 which normally are urged into contact with the outer surface of the first asbestos-cement pipe 4 and the inner surface of the second asbestos-cement pipe 6. Other means may be substituted for the end plugs 12 so long as such means will cooperate to hold the foamable resin material in position during the foaming action. Also, additional means may be utilized after the foaming has been completed to seal the thermal insulation from deleterious attack.

The coupling for joining end portions 8 of adjacent thermally insulated pipes 2 comprises an asbestos-cement coupling 16 which is provided with a pair of spaced annular grooves 18 and 20 in the inner surface thereof. Seated in each groove 18 and 20 is an annular resilient gasket 22 which is adapted to be deformed and urged into sealing engagement with the outer surface of the end portion 8 and the walls defining the groove as the end portion 8 is inserted into the coupling 16. The axially central portion 24 of the coupling 16 has a radial thickness approximately equal to the combined radial thickness of the thermal-insulating material 10 and the second asbestos-cement pipe 6. Since the asbestos-cement material in the coupling 16 has a relatively low thermal conductivity, the thickness of the coupling 16 provides the joint between the adjacent end portions with good thermal properties.

In FIG. 2, there is illustrated a thermally insulated pipe 2 comprising the preferred embodiment of the invention. The first asbestos-cement pipe 4 has a fluid-impervious, chemical-resistant coating 26 on the inner surface thereof and the second asbestos-cement pipe 6 has a fluid-impervious, chemical-resistant coating 28 on the inner surface thereof. The outer surface of the end portion 8 is provided with a fluid-impervious, chemical-resistant coating 30 which is joined to and united with the coating 26. As illustrated in FIG. 2, the coating 30 extends over the outer surface of the portion 8 to a position adjacent the shoulder 34. However, if desired this coating 30 could extend in an axial direction to a position contiguous to the flanges 14 of each end plug 12. The annular space between the outer surface of the first asbestos-cement pipe 4 and the coating 28 is filled with a thermal-insulating material 10, preferably comprising a foamed polyurethane. End plugs 12 retain the foamable material in place during the foaming operation to be explained below. The coupling 16 is similar to that illustrated in FIG. 1 except that the major portion of the inner surface of the coupling 16 and the grooves 18 and 20 is provided with a fluid-impervious, chemical-resistant coating 32 similar to that on the inner surface of the first and second asbestos-cement pipes. As illustrated in FIG. 2, the joint is sealed by annular resilient gaskets 22 one of which is seated in each of the annular grooves 18 and 20. Shoulders 34 on the end portions 8 cooperate with the annular resilient gaskets 22 and the surface defining the grooves 18 and 20 to provide end separation between the axial extremities of adjacent end portions 8. As the end portion 8 of each thermally insulated pipe 2 is inserted into the coupling 16, the annular resilient gasket is deformed and urged into sealing engagement with the coating on the inner surface of the grooves 18 and 20 of the coupling 16 and the coating 30 the outer surface of the end portion 8 so as to provide a fluidtight joint. In the manner, the preferred embodiment of the invention provides a thermally insulated piping system wherein all exposed areas of its inner surface are covered by a fluid-impervious, chemical-resistant coating.

The thermally insulated pipe 2, illustrated in FIG. 2, is formed by first producing two asbestos-cement pipes of suitable sizes on conventional pipe forming machines. The inner surfaces of these pipes are then provided with a fluid-impervious, chemical-resistant coating by any appropriate method, preferable the method described in U.S. Pat. application Ser. No. 141,849 by R. T. Hucks and the epoxy resin formulations described therein. Also, each end portion 8 is provided with a coating 30 of the same epoxy resin formulation which coating is uniformly united with the coating 26 on the first asbestos-cement pipe 4. The first asbestos-cement pipe is inserted into the second asbestos-cement pipe, and the two pipes are placed in an oven so as to raise the temperature throughout each of the pipes to the temperature conventionally used in the foaming of polyurethane. When the asbestos-cement pipes have reached the desired temperature, they are placed in suitable apparatus, such as that described in the copending application of R. W. Campbell filed the same day as the instant application, wherein they are held in coaxial relationship with the second asbestos-cement pipe centered in an axial direction relative to the first asbestos-cement pipe so as to provide for the end portions 8. As explained above because of the difference in diameter of the pipes, there is an annular space between the outer surface of the pipe 4 and the coating 28 of the pipe 6. A first end plug 12 is inserted into the annular space between the first and second asbestos-cement pipes with the flanges 14 thereof respectively in contact with the outer surface of the first asbestos-cement pipe 4 and the coating 26 on the inner surface of the second asbestos-cement pipe 6. The first end plug 12 is located adjacent one axial extremity of the second asbestos-cement pipe. The pipes are now in proper position so that the components for the foamed-in-place polyurethane thermal insulating material may be deposited into the annular space.

In has been found that the proper deposition and foaming of these components may be accomplished if the pipes are held in coaxial relationship at an angle greater than 4° from the horizontal but less than that angle at which the foam would not be able to rise to the elevated axial extremity of the second asbestos-cement pipe. This angle is governed by the diameters of the first and second asbestos-cement pipes, the annular space to be filled and the type of foamable thermal-insulating material used which in this embodiment of the invention comprises a foamed polyurethane. Generally for the normal range of pipes, the angle may vary between about 4° for pipe wherein the first asbestos-cement pipe has a diameter of 3 inches and about 16° for pipe wherein the first asbestos-cement pipe has a diameter of 24 inches. However, in some instances, the smaller diameter pipe may also be positioned at an angle of about 16°. After the coaxially mounted pipes have been positioned at the proper angular relationship, a suitable probe is inserted into the annular space between the first and second asbestos-cement pipes and the components for the foamed polyurethane are pumped through the probe and deposited into the annular space. The end of the probe is inserted a distance of about 18 inches from the end of the second asbestos-cement pipe opposite to the first end plug 12 and foamable material is pumped out of the probe and then urged by gravity toward the first end plug 12. The probe is withdrawn and a second end plug 12 is inserted into the annular space between the first and second asbestos-cement pipes with the flanges 14 thereof respectively in contact with the outer surface of the first asbestos-cement pipe 4 and the coating 28 on the inner surface of the second asbestos-cement pipe 6. The second end plug 12 is located adjacent the other axial extremity of the second asbestos-cement pipe. The heat from the first and second asbestos-cement pipes provides the proper temperature conditions for foaming the components deposited in the annular space by the probe so as to fill the annular space between the outer surface of the first asbestos-cement pipe and the coating on the inner surface of the second asbestos-cement pipe with foamed polyurethane. During the depositing and foaming of the thermal-insulating material, the first and second pipes are held in a fixed position. After the foaming action has been accomplished and the foamed polyurethane has reached a point wherein it has sufficient resistance against flow or slumping and has sufficient strength to support the first asbestos-cement pipe, the newly formed thermally insulated pipe 2 is moved to a horizontal position and removed from the apparatus and set aside to complete the curing of the foamed polyurethane. It has been discovered that the foamed polyurethane has sufficient strength to hold the first and second asbestos-cement pipes in the desired coaxial relationship without requiring spacer elements of any nature so that a more uniform thermal conditioning is obtained. Also, there is no danger of destroying the proper positioning of the thermal-insulating material by an accidental movement of a spacer element during the assembly of the thermally insulated pipe. During the foaming of the components, the flanges 14 are sufficiently flexible to allow the excess gas from the foaming of the thermal-insulating materials to escape. Also, some of the foamed thermal-insulating material will move between the flanges 14 and the associated surfaces of the pipes 2 and 4 to act as an adhesive to bond the end plugs 20 firmly in place adjacent the axial extremities of the second asbestos-cement pipe. A thermally insulated pipe such as that described above is suitable for use in either hot (200° F.) or chilled (40° F.) water systems.

In one embodiment of the invention, the asbestos-cement pipe 4 comprised a 6-inch inside diameter asbestos-cement pressure pipe of the type sold by Johns-Manville under the trade designation "TRANSITE" asbestos-cement pipe, class 150, having an axial extent of about 13.0 feet and a maximum radial wall thickness of about 0.58 inches. The asbestos-cement pipe 6 comprised a 9-inch inside diameter asbestos-cement pipe having a minimum crush strength of 1500 pounds/foot, an axial extent of about 12.4 feet and a maximum radial wall thickness of about 0.44 inches. The asbestos-cement pipe 4 had a coating 26 comprising an epoxy resin formulation having a thickness of about 20 mils and a coating 30 comprising an epoxy resin formulation having a thickness of about 20 mils. The asbestos-cement pipe 6 had a coating 28 comprising an epoxy resin formulation having a thickness of about 15 mils. The annular space between the outer surface of the asbestos-cement pipe 4 and the inner surface of the asbestos-cement pipe 6 had a radial thickness of approximately 0.93 inches which was filled with a foamed-in-place polyurethane thermal-insulating material having a core density of 2.5 pounds/cubic foot. The foamed polyurethane thermal-insulating material comprised the product formed by reacting an isocyanate with a resin compound-containing hydrogen reacted at 190° F. Each end plug 12 comprised an acrylonitrile butadiene styrene material having a thickness of about 40 mils. The coupling 16 had an axial extent of 7.00 inches and the axially central portion thereof had a maximum radial wall thickness of 1.30 inches. The end portion 8 of the asebestos-cement pipe 4 had an axial extent of 4.0 inches. A suitable rubber ring 22 was installed in each of the grooves 18 and 20 so that when in assembled position, the pipe system could withstand inner pressures as great as 520 pounds/square foot without leaking. It is to be understood that the foregoing dimensions are given for illustration purposes only, and the invention is not to be limited thereto; also, that the asbestos-cement pipe 4 may have any inner diameter desired and that the asbestos-cement pipe 6 will be dimensioned corresponding to the physical characteristics required and the thickness of the thermal-insulating material required to provide the desired thermal conditions.

The instant invention provides a thermally insulated piping system comprising a rugged, heavy duty asbestos-cement pipe for both the carrier pipe and the covering pipe that is factory assembled and provided with a joint which is readily and uniformly assembled under any and all conditions while also providing good thermal protection at the joint area. The increased radial thickness of the asbestos-cement coupling together with the relatively low thermal conductivity of the asbestos-cement material and the minimum spacing between the axial extremities of the second asbestos-cement pipe and the coupling provides ample thermal protection at the joint area. Measurements made in a 7,000-foot long pipeline having approximately 700 couplings wherein the first asbestos-cement pipe 4, as described above, had an inside diameter of 6 inches and carried chilled water at a temperature of 40° F. at a flow rate of 3 foot/second and wherein the pipeline was located in surroundings having an ambient temperature of 70°F. showed a heat loss of less than 1°due to the joints. The inventive concepts of the instant application have also been utilized to provide thermally insulated asbestos-cement pipe for pipelines wherein the inner asbestos-cement pipe had inside diameters of 3, 4, 8, 10, 12, 14, and 16 inches.

The thermally insulated pipe of the instant invention provides inner and outer pipes of heavy-duty, rugged, corrosion-resistant asbestos-cement wherein the annular space between the inner and outer pipes is filled from one axial extremity to the other with a thermal-insulating material. This thermal-insulating material is contiguous to both the inner and outer pipes and has sufficient strength to hold the inner and outer pipes in assembled relationship without requiring additional spacer elements. Therefore, the thermal conditioning of the thermally insulated pipe of the instant invention is uniform throughout its longitudinal extent.

Another feature of the preferred embodiment of the invention is the provision of the fluid-impervious protective covering for the thermal-insulating material so that no moisture may collect in the system and do damage to the thermal-insulating material. In thermally insulated pipe of the type described above comprising inner metallic pipes which are encased in an asbestos-cement pipe, the installation of the pipe underground requires the use of manholes at periodic intervals. At each manhole, the pipe is provided with an end cap and drain, so that any moisture in the system such as that from leaking or defective joints or broken outer casings may be drained from the pipe. The thermally insulated pipe of the instant invention does not require drain plugs of any nature and may be installed underground without having to provide manholes at periodic intervals. This elimination of the necessity for draining moisture from the system is further accomplished by the joint of the instant invention in which the end portions of the inner pipe are inserted into the coupling to form the joint. Thus, in the instant invention, even if a joint is defective, the resulting moisture will go into the ground and not into contact with the thermal-insulating material.

A further feature of the instant invention is that the thermally insulated piping system has pipe sections and couplings having substantially the same outside diameter so that special provisions for the coupling do not have to be made when digging the trench. This feature also allows for easy installation of the complete piping system in the trench.

While the invention has been described in rather full detail, it will be understood that these details need not be strictly adhered to and that various changes and modifications may suggest themselves to one skilled in the art, all falling within the scope of the invention as defined by the subjoined claims.

I claim:

1. A pipe system comprising:
 a. a first unit comprising a thermally insulated asbestos-cement fluid conduit;
 b. at least one end portion on said first unit;
 c. a second unit comprising a thermally insulated asbestos-cement fluid conduit;
 d. at least one end portion on said second unit;
 e. a fluid-impervious, chemical-resistant coating on the inner surface of each of said thermally insulated asbestos-cement fluid conduits and on the outer surface of each of said end portions;
 f. an asbestos-cement thread free coupling having a pair of spaced annular grooves in the inner surface thereof and a fluid-impervious, chemical-resistant coating on the inner surface of said coupling between said grooves and on at least some of the surfaces defining said grooves;
 g. each of said fluid-impervious, chemical-resistant coatings being continuous in both the circumferential and longitudinal directions;
 h. an annular resilient gasket seated in each of said grooves; and
 i. each of said end portions being inserted into said asbestos-cement coupling so that each of said annular resilient gaskets is deformed to effect a fluidtight seal between said coating on the outer surface of each of said end portions and said fluid-impervious chemical-resistant coating on the surfaces of each of said grooves.

2. Thermally insulated pipe comprising:
 a. a first and a second asbestos-cement pipe in coaxial relationship;
 b. said first asbestos-cement pipe having an outside diameter less than the inside diameter of said second asbestos-cement pipe so as to provide an annular space between said first and second asbestos-cement pipes;
 c. thermal-insulating material positioned in said annular space;
 d. said thermal-insulating material being in contact with the outer surface of said first asbestos-cement pipe and the inner surface of said second asbestos-cement pipe and supporting said first and second asbestos-cement pipes in said coaxial relationship;
 e. said first asbestos-cement pipe having a fluid-impervious coating on its inner surface extending along its entire axial length and said second asbestos-cement pipe having a fluid-impervious coating on its inner surface extending along its entire axial length to prevent fluid carried through said first pipe and moisture from around said second pipe from passing radially into said annular space containing said thermal-insulating material and
 f. means extending between the outer surface of said first asbestos-cement pipe and said inner surface of said second asbestos-cement pipe and providing a fluid seal adjacent the axial extremities of said thermal-insulating material.

3. A pipe system comprising:
 a. a first and a second asbestos-cement pipe in coaxial relationship;
 b. said first asbestos-cement pipe having an outside diameter less than the inside diameter of said second asbestos-cement pipe so as to provide an annular space between said first and second asbestos-cement pipes;
 c. thermal-insulating material positioned in said annular space;
 d. said thermal-insulating material being in contact with the outer surface of said first asbestos-cement pipe and inner surface of said second asbestos-cement pipe and supporting said first and second asbestos-cement pipes in said coaxial relationship;

e. said first asbestos-cement pipe having a longitudinal length greater than said second asbestos-cement pipe so as to provide at least one end portion for said coaxial first and second asbestos-cement pipes; and
f. means on the outer surface of said end portion for cooperation with an asbestos-cement coupling for joining adjacent pipes an asbestos-cement coupling having at least one annular groove in the inner surface thereof;
g. an annular resilient gasket seated in said groove;
h. said end portion being inserted into said coupling so that said annular resilient gasket is deformed to effect a fluidtight seal between said coupling and said end portion;
i. said coupling having an outside diameter substantially equal to the outside diameter of said second asbestos-cement pipe.

4. A pipe system as defined in claim 3 and further comprising:
a. a fluid-impervious, chemical-resistant coating on the inner surface of said first and second asbestos-cement pipes and said coupling.

5. A pipe system comprising:
a. a first and a second asbestos-cement pipe in coaxial relationship;
b. said first asbestos-cement pipe having an outside diameter less than the inside diameter of said second asbestos-cement pipe so as to provide an annular space between said first and second asbestos-cement pipes;
c. thermal-insulating material positioned in said annular space;
d. said thermal-insulating material substantially filling said annular space between said first and second asbestos-cement pipe;
e. a fluid-impervious coating on the inner surface of said first and second asbestos-cement pipes extending along the entire axial length of each of said asbestos-cement pipes adapted to prevent fluid carried through said first pipe and moisture around said second pipe from passing radially into said annular space containing said thermal insulation.